United States Patent
Bouzekri

(10) Patent No.: US 6,478,901 B1
(45) Date of Patent: Nov. 12, 2002

(54) ALUMINUM-KILLED LOW-CARBON STEEL SHEET FOR CONTAINERS AND METHOD FOR ITS PREPARATION

(75) Inventor: Mohamed Bouzekri, Rombas (FR)

(73) Assignee: Sollac, Puteaux (FR)

(*) Notice: Subject to any disclaimer, the term of this patent is extended or adjusted under 35 U.S.C. 154(b) by 18 days.

(21) Appl. No.: 09/609,400

(22) Filed: Jul. 3, 2000

(30) Foreign Application Priority Data

Jul. 1, 1999 (FR) .............................. 99 08413

(51) Int. Cl.⁷ .................................................. C21D 8/00
(52) U.S. Cl. ........................ 148/622; 148/653; 148/654
(58) Field of Search ................................. 148/622, 653, 148/654, 662, 663

(56) References Cited

FOREIGN PATENT DOCUMENTS

| DE | 196 22 164 |   | 5/1997 |
|----|------------|---|--------|
| EP | 0171197    | * | 2/1986 |
| EP | 0 360 955  |   | 4/1990 |
| EP | 0 906 961  |   | 4/1999 |
| FR | 2 472 021  |   | 1/1981 |
| GB | 2 086 425  |   | 5/1982 |

OTHER PUBLICATIONS

Patent Abstracts of Japan, 56158822, Jul. 12, 1981.

* cited by examiner

Primary Examiner—Sikyin Ip
(74) Attorney, Agent, or Firm—Oblon, Spivak, McClelland, Maier & Neustadt, P.C.

(57) ABSTRACT

A process for manufacturing an aluminum-killed low-carbon steel strip by supplying a hot-rolled steel strip having by weight from 0.022 to 0.035% of carbon, from 0.15 to 0.25% of manganese, from 0.040 to 0.70% of aluminum, from 0.0035 to 0.0060% of nitrogen, the remainder being iron and trace impurities, passing the strip through a first cold-rolling, annealing the cold-rolled strip, in which the annealing is continuous using a cycle including: a temperature rise up to a first temperature higher than an onset temperature of pearlitic transformation $Ac_1$, holding the strip above the first temperature for a duration of longer than 10 seconds, rapidly cooling the strip to a second temperature below 100° C. at a cooling rate in excess of 100° C. per second, thermally treating the strip at a temperature from 100° C. to 350° C. for a duration in excess of 10 seconds, and cooling the strip to room temperature.

11 Claims, 6 Drawing Sheets

ALUMINUM-KILLED LOW-CARBON STEEL SHEET FOR CONTAINERS AND METHOD FOR ITS PREPARATION

BACKGROUND OF THE INVENTION

1. Field of the Invention

The present invention relates to a process for the preparation of aluminum-killed low carbon steel sheets and the steel sheets prepared thereby, and in particular their use in the field of metal containers for food, non-food products or industrial purposes.

2. Discussion of the Background

Steels smelted for uses specific to metal containers differ from thin sheets, particularly in their physical characteristics.

The thicknesses of steel sheets for containers vary from 0.12 mm to 0.25 mm for the great majority of uses, but can reach greater thicknesses, as much as 0.49 mm, for very special applications. This is the case, for example, in certain containers for non-food products, such as certain aerosols, or in the case of certain industrial containers. The thickness can also be as small as 0.08 mm, in the case of food receptacles, for example.

Steel sheets for containers are usually coated with a metal coat (tin, which may or may not be remelted, or chrome), on which there is generally deposited an organic coat (varnish, inks, plastic films).

In the case of two-piece containers, these are made by deep-drawing under a blank holder or by deep-drawing/trimming for beverage cans, and are generally cylindrical or frustoconical, axially symmetric cans. Container designers are showing increasing interest in even thinner steels, however, with thickness from 0.12 mm to 0.075 mm and, with the objective of distinguishing themselves from the competitors, they are trying to introduce increasingly more complex shapes. Thus one can now find cans of original shapes, manufactured from steel sheets of small thickness, which sheets, even though presenting greater forming difficulties, must meet the use criteria (mechanical durability of the containers, resistance to the axial load to which they are subjected during storage in stacks, resistance to the internal overpressure to which they are subjected during sterilizing heat treatment and to the internal partial vacuum to which they are subjected after cooling) and therefore must have very high mechanical strength.

Thus the use and performance of these containers depend on a variety of mechanical characteristics of the steel, including but not limited to:

coefficient of planar anisotropy, $\Delta C$ aniso,

Lankford coefficient, yield strength Re, maximum rupture strength Rm, elongation A %, distributed elongation Ag %.

To impart to the container equivalent mechanical strength at smaller steel thickness, it is indispensable that the steel sheet present a higher maximum rupture strength.

It is known that containers can be made by using standard aluminum-killed low-carbon and low manganese steels.

The carbon content customarily sought for this type of steel ranges between 0.020% and 0.040%, because contents in excess of 0.040% lead to mechanical characteristics less favorable for deep-drawing, and contents below 0.020% bring about a tendency to natural aging of the sheet, despite an aging in annealing.

The manganese is reduced as much as possible because of an unfavorable effect of this element on the value of the Lankford coefficient for steels not degassed under vacuum. Thus the manganese content sought ranges between 0.15 and 0.25%.

These steel sheets are made by cold rolling a hot strip to a cold-rolling ratio of between 75% and more than 90%, followed by continuous annealing at a temperature of between 640 and 700° C., and a second cold-rolling with a percentage elongation which varies between 2% and 45% during this second cold-rolling, depending on the desired level of maximum rupture strength Rm.

For aluminum-killed low-carbon steels, however, high mechanical characteristics are associated with poor elongation capacity. This poor ductility, apart from the fact that it is unfavorable to forming of the container, leads during such forming to thinning of the walls, a phenomenon which will be unfavorable to the performances of the container.

Thus for example, a "renitrided low-aluminum" steel with a maximum rupture strength Rm on the order of 550 MPa will have a percentage elongation A % on the order of only 1 to 3%.

SUMMARY OF THE INVENTION

Accordingly, one objective of the present invention is to provide an aluminum-killed low-carbon steel sheet for containers which has, at a level of maximum rupture strength equivalent to that of aluminum-killed low-carbon steels of the prior art, a higher percentage elongation A %.

A further objective of the present invention is to provide a process for production of the above-noted aluminum-killed low-carbon steel sheet.

These and other objects of the present invention have been satisfied by the discovery of a process for manufacturing an aluminum-killed low-carbon steel strip comprising:

supplying a hot-rolled steel strip comprising by weight from 0.022 to 0.035%, preferably from 0.022 to 0.030%, of carbon, from 0.15 to 0.25%, preferably from 0.17 to 0.22%, of manganese, from 0.040 to 0.070%, preferably from 0.045 to 0.060%, of aluminum, from 0.0035 to 0.0060%, preferably from 0.0035 to 0.0050%, of nitrogen, and the remainder being iron and trace impurities, passing the strip through a first cold-rolling, and annealing the cold-rolled strip;

wherein the annealing step is a continuous annealing using a cycle comprising a temperature rise up to a first temperature higher than an onset temperature of pearlitic transformation $Ac_1$, holding the strip above the first temperature for a duration of longer than 10 seconds, and rapidly cooling the strip to a second temperature of below 100° C. at a cooling rate in excess of 100° C. per second, thermally treating the strip at a temperature of from 100° C. to 300° C. for a duration in excess of 10 seconds, and cooling to room temperature.

BRIEF DESCRIPTION OF THE FIGURES

The characteristics and advantages will be made more clearly apparent in the description hereinafter, given exclusively by way of example, with reference to the attached figures.

DETAILED DESCRIPTION OF THE PREFERRED EMBODIMENTS

Figure 1:
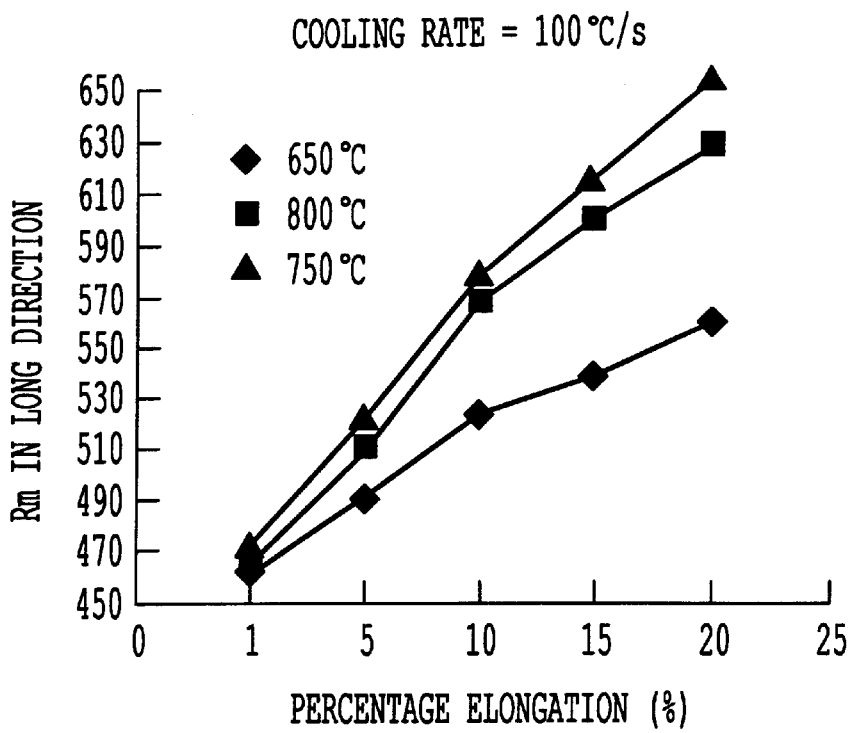
FIG. 1 is a diagram showing the influence of annealing temperature at constant cooling rate on maximum rupture strength Rm.

The present invention relates to a process for manufacturing an aluminum-killed medium-carbon steel strip for containers, comprising:

supplying a hot-rolled steel strip containing by weight from 0.022 to 0.035% of carbon, from 0.15 to 0.25% of manganese, from 0.040 to 0.070% of aluminum, and from 0.0035 to 0.0060% of nitrogen, the remainder being iron and the inevitable trace impurities, passing the strip through a first cold-rolling, annealing the cold-rolled strip, and optionally, performing a secondary cold-rolling, wherein the annealing is a continuous annealing using a cycle comprising a temperature rise up to a temperature higher than the temperature of onset of pearlitic transformation $Ac_1$. holding the strip above this temperature for a duration of longer than 10 seconds, and rapidly cooling the strip to a temperature of below 100° C. at a cooling rate in excess of 100° C. per second, thermally treating the strip at a temperature from 100° C. to 300° C. for a period of time in excess of 10 seconds, and cooling to room temperature.

According to alternate embodiments of the present process:

after rapid cooling of the strip and prior to thermal treatment at low temperature, a plastic deformation operation is performed by elongation of the strip with a percentage elongation of from 1 to 5%;

the strip is maintained during annealing at a temperature of from $Ac_1$ to 800° C. for a duration ranging from 10 seconds to 2 minutes;

the cooling rate is from 100° C. to 500° C. per second;

the strip is maintained during the thermal treatment at a low temperature of from 100° C. to 300° C. for a duration ranging from 10 seconds to 2 minutes; or the plastic deformation operation by elongation of the strip is performed by planishing under traction or by rolling.

The invention also relates to an aluminum-killed medium-carbon steel sheet for containers, comprising by weight from 0.022 to 0.035% of carbon, from 0.15 to 0.25% of manganese, from 0.040% to 0.070% of aluminum, from 0.0035 to 0.0060% of nitrogen, the remainder being iron and the inevitable trace impurities, manufactured according to the above mentioned process, wherein the steel sheet has, in aged condition, a percentage elongation A % satisfying the relationship:

$$(670-Rm)/14 \leq A\% \leq (720-Rm)/17$$

where Rm is the maximum rupture strength of the steel, expressed in MPa.

According to other characteristics of the sheet, the steel contains COTTRELL atmospheres and/or epsilon carbides precipitated at low temperature, and it has a grain count per $mm^2$ greater than 20000.

Influence of the Composition of the Steel

As indicated above, the present invention does not relate principally to the composition of the steel, which is a standard aluminum-killed low-carbon steel.

As for all aluminum-killed low-carbon steels, it is essentially the carbon and manganese contents which are important:

The carbon content customarily sought for this type of steel ranges between 0.022% and 0.040%, because contents in excess of 0.040% lead to mechanical characteristics less favorable for deep-drawing. For contents of less than 0.022%, there is no pearlitic transformation in cooling, and this pearlitic transformation is necessary.

The manganese is reduced as much as possible because of an unfavorable effect of this element on the value of the Lankford coefficient for steels not degassed under vacuum. Thus the manganese content is preferably between 0.15 and 0.25%.

Nitrogen and aluminum also are two elements which it is expedient to control.

Extra nitrogen is used if it is wished to obtain a hard, aging steel. It generally ranges between 0.0035 and 0.0060%.

Aluminum is used to kill the steel. It generally ranges between 0.040 and 0.070%.

Influence of the Hot-denaturing Conditions

The continuously annealed aluminum-killed medium-carbon steels are rolled at a temperature above $Ar_3$.

The essential parameter is the coiling temperature, cold coiling between 500 and 620° C. being preferred. In fact, hot coiling, at a temperature above 650° C., presents two drawbacks;

it generates heterogeneities in mechanical characteristics related to the differences between the cooling rates of the core and the extremities of the strip;

it leads to a risk of abnormal grain growth, which can occur for certain combinations (temperature at end of rolling, coiling temperature) and can constitute a latent defect both in hot sheet and in cold sheet.

Nevertheless, hot coiling may be achieved by using, for example, a selective coiling method, in which the temperature is higher at the extremities of the strip.

Influence of the Cold-rolling Conditions

By virtue of the small final thicknesses to be achieved, the range of cold reduction ratio extends from 75% to more than 90%.

The main factors involved in the definition of the cold reduction ratio quite obviously are the final thickness of the product, which can be influenced by choice of the thickness of the hot product, and also metallurgical considerations.

The metallurgical considerations are based on the influence of the cold reduction ratio on the microstructural condition and, consequently, on the mechanical characteristics after recrystallization and annealing. Thus an increase in cold reduction ratio leads to a lower recrystallization temperature, to smaller grains and to higher values of Re and Rm. In particular, the reduction ratio has a very strong influence on the Lankford coefficient.

In the case of requirements applicable to deep-drawing spurs, it is appropriate, for example, to optimize the steel grade, especially the carbon content, and the reduction ratio of cold rolling with the hardness or the desired mechanical characteristics in order to obtain a metal known as "spur-free metal".

Influence of Annealing

An important characteristic of the invention resides in the annealing temperature. It is important that the annealing temperature be higher than the point of onset of pearlitic transformation $Ac_1$ (on the order of 720° C. for this type of steel).

Another important characteristic of the invention resides in the cooling rate, which must be greater than 100° C./s.

While the strip is being held at a temperature above $Ac_1$ there is formed carbon-rich austenite. The rapid cooling of this austenite allows a certain quantity of carbon and nitrogen to be maintained in the free state.

It is therefore important to perform rapid cooling, between 100 and 500° C./s, at least to a temperature below 100° C. If the rapid cooling is stopped before 100° C., the atoms of free carbon and nitrogen will be able to combine and the desired effect will not be achieved. Rapid cooling to room temperature is also possible.

It is also possible to perform cooling at a rate faster than 500° C./s, but the influence of an increase in cooling rate beyond 500° C./s is not very significant.

This annealing at high temperature with rapid cooling is followed by a thermal treatment at low temperature, which can be called a pseudo-overaging thermal treatment.

An important characteristic of this low temperature thermal treatment is the strip holding temperature, which is in the range of from 100 to 350° C. The rates of temperature increase and cooling during this low temperature thermal treatment are of little importance.

The purpose of this low temperature thermal treatment is to cause the free carbon atoms to precipitate in the form of fine, disperse low-temperature carbides and/or epsilon carbides. It also makes possible segregation of the free carbon and nitrogen atoms at the dislocations to form COTTRELL atmospheres.

Figure 2:
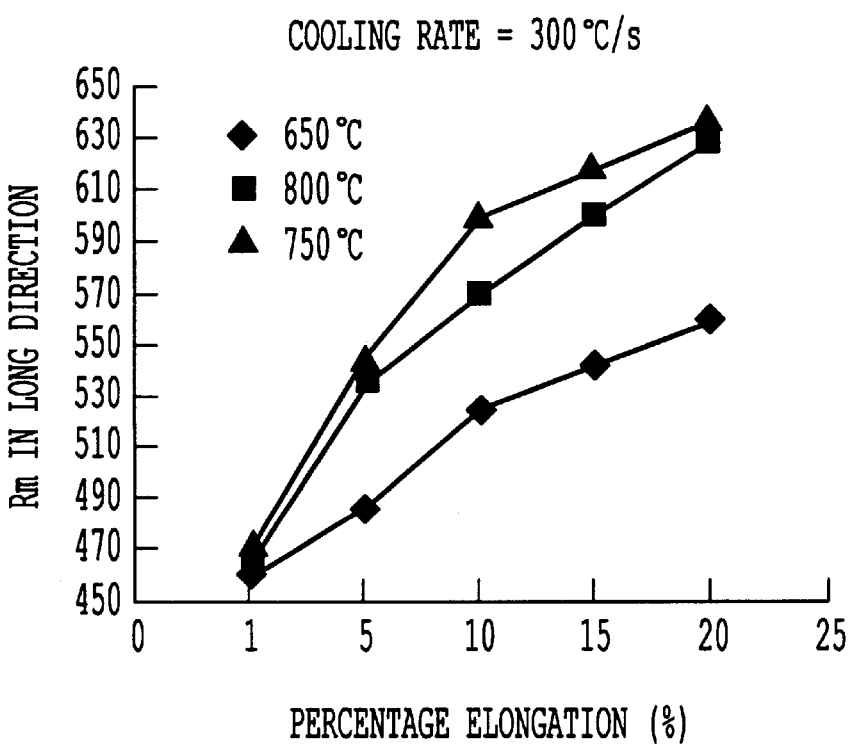
FIG. 2 is a diagram showing the influence of annealing temperature at constant cooling rate on maximum rupture strength Rm.

FIGS. 1 and 2 show the influence of annealing temperature at constant cooling rate (target rate 100° C./s; actual rate 73 to 102° C./s on FIG. 1 target rate 300° C./s; actual rate 228 to 331° C./s on FIG. 2) on the maximum rupture strength Rm.

It is evident from these figures that, for identical percentage elongation in the second rolling, Rm is clearly greater for the steels annealed at 740° C. and at 780° C. compared with the same steel annealed at 650° C. and at 680° C.

Nevertheless, this influence of annealing temperature on maximum rupture strength Rm is not very perceptible when the percentage elongation in the second cold-rolling is less than 3%. It becomes truly significant only starting from 5% elongation in the second cold-rolling.

If the temperature is too high (above 800° C.), there occurs at least partial precipitation of the nitrogen in the form of aluminum nitrides. This precipitated nitrogen no longer contributes to hardening of the steel, and the resulting effect is lowering of the maximum rupture strength Rm. There are signs of this phenomenon in FIG. 2, where it is noted that, for percentage elongations greater than 10%, the increase in maximum rupture strength Rm between the sample annealed at 750° C. and the sample annealed at 800° C. becomes smaller.

The time for which the strip is held between 720° C. and 800° C. must be sufficient to return all the carbon corresponding to equilibrium to solution. A holding time of 10 seconds is sufficient to ensure this return to solution of the quantity of carbon corresponding to equilibrium for the steels whose carbon content ranges between 0.022 and 0.035%, and a holding time of longer than 2 minutes, although possible, is impractical and costly.

Figure 3:
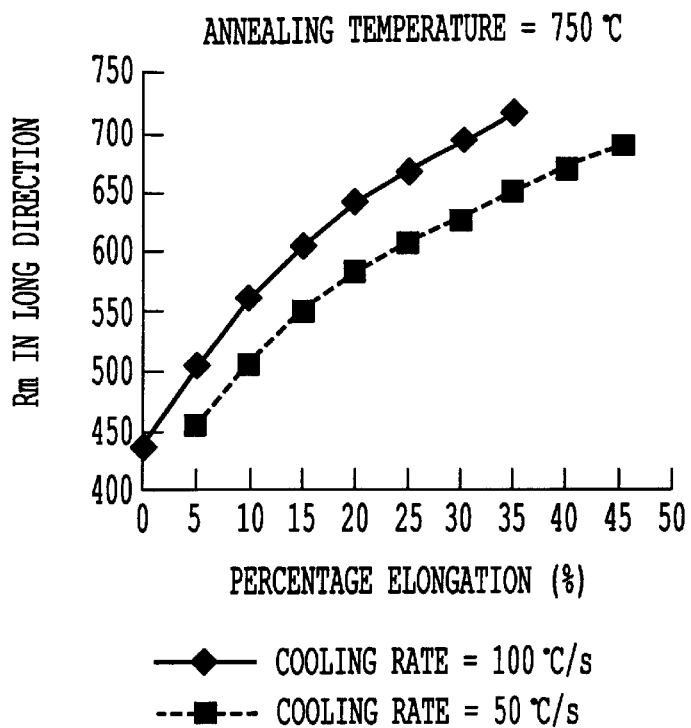
FIG. 3 is a diagram showing the influence of cooling rate on maximum rupture strength Rm.
Figure 4:
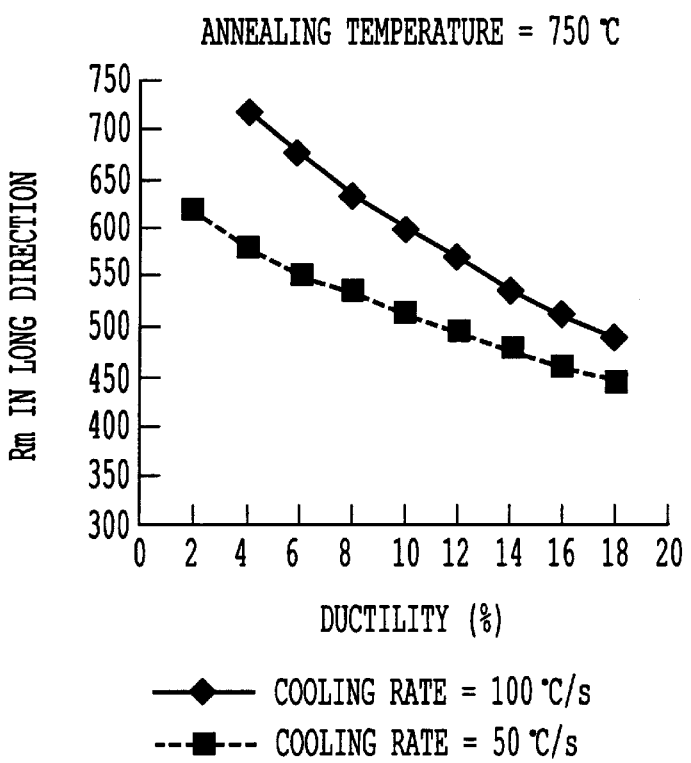
FIG. 4 is a diagram showing the influence of cooling rate on maximum rupture strength Rm and on the percentage elongation A %.

FIGS. 3 and 4 show the influence of cooling rate at constant annealing temperature (750° C.) maintained for 20 seconds.

As can be seen in FIG. 3, at 10% elongation in the second cold-rolling, the maximum rupture strength Rm of the steel is equal to about 520 MPa if the cooling rate is equal to 100° C./s, whereas it reaches only 440 MPa if the cooling rate is equal to 50° C./s.

It is therefore possible to obtain an aluminum-killed low-carbon steel whose value of Rm is equal to 520 MPa with only 10% elongation in the second cold-rolling if the cooling rate is equal to 100° C./s, whereas a second cold-rolling must be carried out with a percentage elongation of 25% if the cooling rate is only 50° C./s.

By virtue of this smaller percentage elongation in the second cold-rolling step, it is possible to minimize the loss of ductility of the steel. In FIG. 4, for example, it is evident that the steel having an Rm equal to 520 MPa has a ductility A % equal to 14 when the cooling rate is equal to 100° C./s, whereas it is equal to 3.5 when the cooling rate is equal to 50° C./s.

By virtue of this smaller percentage elongation in the second cold-rolling step, it is possible to minimize the loss of ductility of the steel. In FIG. 4, for example, it is evident that the steel whose Rm is equal to 520 MPa has a ductility A % equal to 14 when the cooling rate is equal to 100° C./s, whereas it is equal to 3.5 when the cooling rate is equal to 50° C./s.

Figure 5:
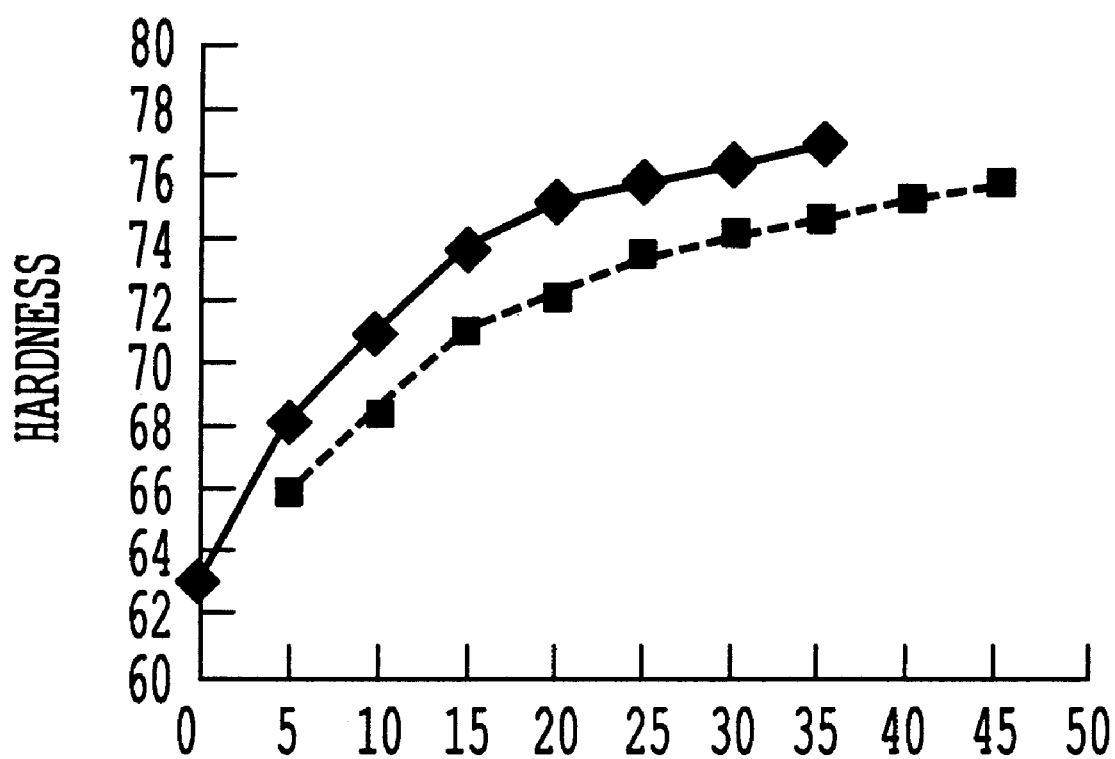
FIG. 5 is a diagram showing the influence of cooling rate on hardness HR30T.

This observation is also valid for the hardness of the steel. As is evident from FIG. 5, for the same percentage elongation in the second cold-rolling, the hardness of the steel increases if the cooling rate is equal to 100° C./s. This increase of the hardness is due to a higher content of free carbon and/or to the presence of fine and disperse precipitates.

Figure 6:
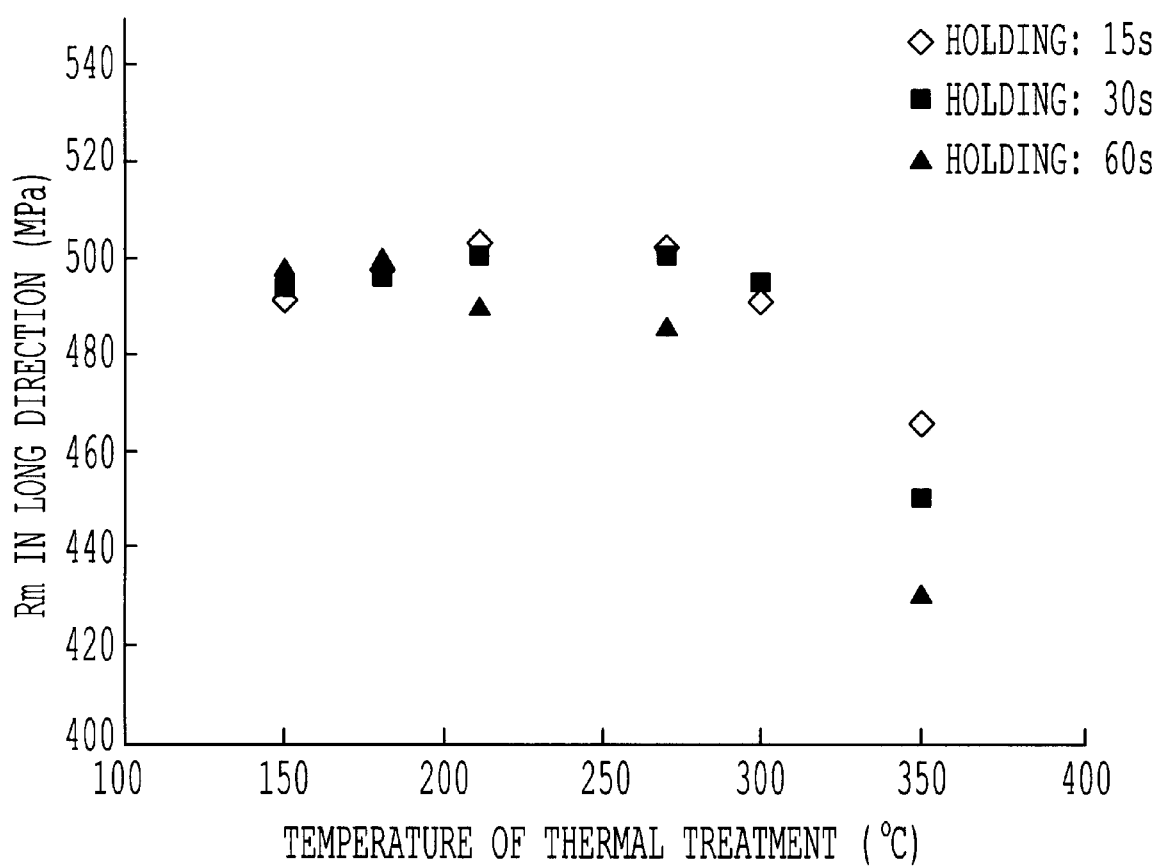
FIG. 6 is a diagram showing the influence of the thermal treatment at low temperature on maximum rupture strength Rm.

As can be seen in FIG. 6, for a steel annealed for 20 seconds at 750° C. and cooled with a cooling rate equal to 100° C./s, then cold rolled with a percentage elongation equal to 10%, the maximum rupture strength Rm increases if a thermal treatment at low temperature is performed after annealing at high temperature. Thus, for example, for Steel A, thermal treatment at 150° C. makes it possible to increase the Rm value by approximately 50 MPa with a secondary cold-rolling percentage equal to 10% as compared with the same steel not having been subjected to thermal treatment at low temperature and having been subjected to a secondary cold rolling with percentage elongation equal to 18% (Rm =520 MPa without thermal treatment at low temperature after annealing at high temperature, and Rm=490 MPa after thermal treatment at 150° C.).

It is shown in this Figure that the maximum rupture strength Rm decreases when the temperature of the thermal treatment exceeds 300° C. For example, after thermal treatment at 350° C., the Rm value is equal only to 450 MPa on an average, which represents a decline of 20 MPa as compared with the same steel obtained without thermal treatment at low temperature, with the exception of the difference in percentage elongation during secondary cold rolling. This decrease in Rm with the temperature of the thermal treatment is due to a precipitation of the carbon in the form of cementite.

Figure 7:
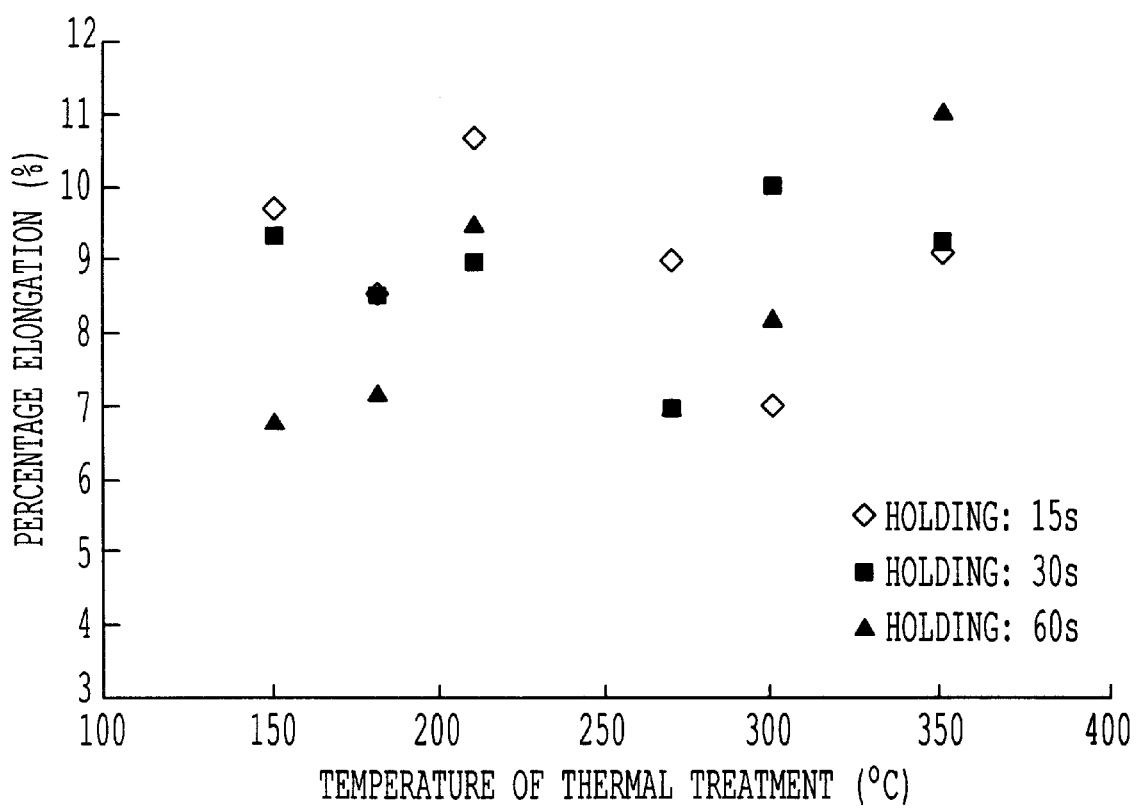
FIG. 7 is a diagram showing the influence of the thermal treatment at low temperature on the percentage elongation A %.

As is seen in FIG. 7, the thermal treatment at low temperature also makes it possible to increase the percentage elongation A %, which thus rises from 4.8% on the average to 9%, all other things being equal.

Influence of Plastic Deformation by Elongation

It is further possible to increase the hardening phenomenon of the steel by performing, after rapid cooling of the strip and prior to thermal treatment at low temperature, a plastic deformation operation by elongation of the strip with a percentage elongation ranging between 1 and 5%.

This plastic deformation creates dislocations on which there will form, during the thermal treatment at low temperature, COTTRELL atmospheres, that is, accumulations of free carbon and nitrogen atoms around the dislocations generated by the plastic deformation, and/or epsilon carbides. Thus, following the thermal treatment at low temperature, the dislocations generated by the deformation of the material will be immobilized or anchored by these COTTRELL atmospheres, which has the effect of hardening of the steel.

Figure 8:
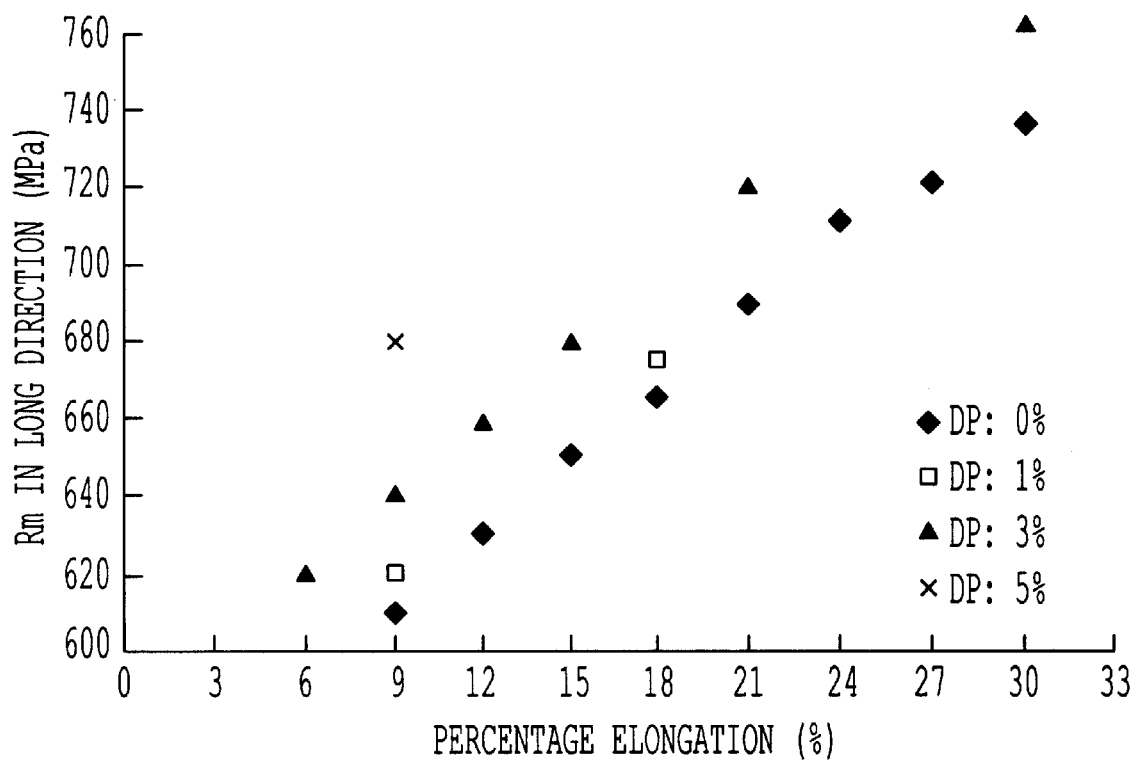
FIG. 8 is a diagram showing the influence of the plastic deformation by elongation on maximum rupture strength Rm.

As is seen in FIG. 8, at an identical total percentage elongation, the maximum rupture strength Rm of the steel A increases significantly if a small plastic deformation by elongation is performed between annealing at high temperature and thermal treatment at low temperature. For example, it is seen that for a total percentage elongation equal to 15% implemented a single time after thermal treatment at low temperature, the Rm value is equal to 645 MPa. On the other hand, if an intermediate plastic deformation is performed with a percentage elongation equal to 3%, the total percentage elongation remaining equal to 15% (which means that the percentage elongation is decreased during the secondary cold rolling), the Rm value is equal to 675 MPa.

This intermediate plastic deformation by elongation may be performed by planishing under traction or by rolling.

The micrographic analyses of the samples revealed that the grain count per mm$^2$ is larger (greater than 20000) and that the carbides, when they are formed, comprise intergranular cementite.

Thus this manufacturing process makes it possible to obtain an aluminum-killed low-carbon steel for containers, comprising by weight between 0.022 and 0.035% of carbon, between 0.15 and 0.25% of manganese, between 0.040 and 0.070% of aluminum, between 0.035 and 0.0060% of nitrogen, the remainder being iron and the inevitable trace impurities, which steel has in the aged condition a percentage elongation A % satisfying the relationship:

$$(670-Rm)/14 \leq A\% \leq (720 \leq Rm)/17$$

where Rm is the maximum rupture strength of the steel, expressed in MPa. The effects of the process according to the invention (thermal treatment at low temperature after rapid cooling) also are visible for steels having a carbon content of which is in excess of 0.040%. This typically is the case of steels used for applications not requiring an intense deep-drawing, for example to produce the bodies of three-piece cans or bottoms of cans. The carbon content of these steels generally ranges between 0.040 and 0.080%.

EXAMPLES

Having generally described this invention, a further understanding can be obtained by reference to certain specific examples which are provided herein for purposes of illustration only and are not intended to be limiting unless otherwise specified.

Several tests were performed, first in the laboratory and then under industrial conditions, in order to validate the characteristics of the invention. The complete results of two of those tests will now be described.

These tests relate to two cold coils of aluminum-killed low-carbon steel, whose characteristics are presented below in Table 1.

TABLE 1

|   | Contents (10$^{-3}$%) | | | | Hot rolling | | | Cold rolling | |
|---|---|---|---|---|---|---|---|---|---|
|   | C | Mn | Al | N | Rolling end temp. (° C.) | Upcoiling temp. (° C.) | Thickness (mm) | Red. ratio (%) | Thickness (mm) |
| A | 23 | 186 | 50 | 3.6 | 860/880 | 530/565 | 1.97 | 89.8 | 0.20 |
| B | 25 | 203 | 58 | 4.8 | 530/565 | 530/565 | 2.00 | 87 | 0.28 |

The coil symbol is shown in the first column, the second through fifth columns indicate the contents in 10$^{-3}$ Wt % of the main constituents of importance. The sixth through eighth columns relate to the hot-rolling conditions: in the sixth column there is indicated the temperature at the end of hot rolling; in the seventh column the coiling temperature; in the eighth column the thickness of the hot strip. Finally, columns nine and ten relate to the cold-rolling conditions: in the ninth column there is indicated the percentage reduction achieved by cold rolling and in the tenth column the final thickness of the cold strip.

These two standard strips were subjected to different annealings followed by second cold-rollings, which were also different.

The holding temperatures in annealing varied from 650° C. to 800° C., the cooling rates varied from 40° C./s to 400° C./s, the low-temperature annealing temperatures varied from 150 to 350° C., and the percentage elongations in the second rolling varied from 1% to 42%, with or without deformation in intermediate elongation.

In addition to the micrographic examinations, the characterization of the metal obtained from these different tests comprised on the one hand performing tension tests on 12.5×50 ISO specimens in the rolling direction and in the cross direction, in both the fresh condition and in the aged condition after aging at 200° C. for 20 minutes, and on the other hand determining the hardness HR30T, also in both the fresh condition and in the aged condition.

On the basis of these tests it was demonstrated that it is possible considerably to increase the maximum rupture strength Rm for the same aluminum-killed low-carbon steel, with identical percentage elongation in the second cold-rolling, if a continuous annealing according to the conditions of the invention is performed between the two cold-rollings.

In other words, it was demonstrated on the basis of these tests that it is possible considerably to increase the ductility A % for the same aluminum-killed low-carbon steel with identical maximum rupture strength Rm if a continuous annealing according to the conditions of the invention is performed between the two cold-rollings, because the same level of Rm is achieved with a smaller percentage elongation during the second rolling. Thus it becomes possible to obtain grades of aluminum-killed low-carbon steel with an Rm level on the order of 380 MPa without necessitating a second rolling step after annealing, other than, perhaps, a light work-hardening operation known as skin pass, in order to suppress the yield-strength plateau present on the metal upon discharge from annealing.

The present application is based on French patent application serial no. 99 08 413, filed with the French Patent Office on Jul. 1, 1999, the entire contents of which are hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed is:

1. A process for manufacturing an aluminum-killed low-carbon steel strip comprising:

supplying a hot-rolled steel strip comprising by weight from 0.022 to 0.035% of carbon, from 0.15 to 0.25% of manganese, from 0.040 to 0.070% of aluminum, from 0.0035 to 0.0060% of nitrogen, the remainder being iron and trace impurities, passing the strip through a first cold-rolling, annealing the cold-rolled strip, wherein the annealing is a continuous annealing using a cycle comprising:

a temperature rise up to a first temperature higher than an onset temperature of pearlitic transformation $Ac_1$, holding the strip above the first temperature for a duration of longer than 10 seconds, rapidly cooling the strip to a second temperature of below 100° C. at a cooling rate in excess of 100° C. per second, thermally treating the strip at a temperature of from 100° C. to 350° C. for a duration in excess of 10 seconds, and cooling the strip to room temperature, wherein after said rapidly cooling and prior to said thermally treating at low temperature, a plastic deformation operation is performed by elongation of said strip with a percentage elongation ranging from 1 to 5%.

2. The process according to claim 1, wherein said plastic deformation operation by elongation of said strip is performed by planishing under traction.

3. A process according to claim 1, wherein said plastic deformation operation by elongation of said strip is performed by rolling.

4. The process according to claim 1, wherein the process further comprises performing a second cold rolling after said annealing step.

5. The process according to claim 1, wherein said temperature rise is up to a first temperature higher than 720° C.

6. The process according to claim 1, wherein said thermally treating is at a temperature of from 100° C. to 300° C.

7. The process according to claim 1, wherein said strip is maintained during annealing at a temperature of from $Ac_1$ to 800° C. for a duration longer than 10 seconds to 2 minutes.

8. The process according to claim 1, wherein said cooling step is performed at a cooling rate in excess of 100° C. per second to 500° C. per second.

9. The process according to claim 1, wherein said thermally treating is performed at a temperature ranging from 100° C. to 300° C. for a duration in excess of 10 seconds to 2 minutes.

10. The process according to claim 1, wherein said strip comprises by weight from 0.022 to 0.030% of carbon, from 0.17 to 0.22% of manganese, from 0.045 to 0.060% of aluminum and from 0.0035 to 0.0050% of nitrogen.

11. The process according to claim 1, wherein said thermally treating is from 100° C. to 300° C. for a duration in excess of 10 seconds.

* * * * *